United States Patent
Patel et al.

(10) Patent No.: US 10,540,308 B2
(45) Date of Patent: Jan. 21, 2020

(54) SYSTEM AND METHOD FOR PROVIDING A REMOTE KEYBOARD/VIDEO/MOUSE IN A HEADLESS SERVER

(71) Applicant: DELL PRODUCTS, LP, Round Rock, TX (US)

(72) Inventors: Rajeshkumar I. Patel, Bangalore (IN); Elie A. Jreij, Pflugerville, TX (US); Syama S. Poluri, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 249 days.

(21) Appl. No.: 15/161,835

(22) Filed: May 23, 2016

(65) Prior Publication Data
US 2017/0337147 A1 Nov. 23, 2017

(51) Int. Cl.
*G06F 13/42* (2006.01)
*G06F 13/36* (2006.01)

(52) U.S. Cl.
CPC .......... *G06F 13/36* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,559,795 B2 | 7/2009 | Byrne | |
| 2004/0042547 A1* | 3/2004 | Coleman | H04N 21/4143 375/240.01 |
| 2005/0046744 A1 | 3/2005 | Ohkubo et al. | |
| 2008/0098411 A1* | 4/2008 | Dirstine | G06F 9/451 719/327 |
| 2008/0195777 A1* | 8/2008 | Dickens | G06F 3/14 710/62 |
| 2009/0189863 A1* | 7/2009 | Liu | G06F 3/023 345/168 |
| 2009/0300243 A1 | 12/2009 | Chao | |
| 2009/0319099 A1* | 12/2009 | Corbefin | G06F 3/023 701/3 |
| 2011/0307639 A1* | 12/2011 | Dai | H04L 49/70 710/106 |
| 2016/0127615 A1 | 5/2016 | Ikeuchi | |

OTHER PUBLICATIONS

Wikipedia, Headless computer, Sep. 2013, p. 1-2.*
Michael Otey, Windows Nano Server, Apr. 2015, p. 1-5.*

* cited by examiner

*Primary Examiner* — Henry Tsai
*Assistant Examiner* — Dean Phan
(74) *Attorney, Agent, or Firm* — Larson Newman, LLP

(57) ABSTRACT

An information handling system includes a host system, an embedded controller, and a management system. The embedded controller receives first serial data from the host system, converts the first serial data into first video frame information, and stores the first video frame information to a frame buffer of the embedded controller. The management system reads the first video frame information from the frame buffer.

20 Claims, 4 Drawing Sheets

SYSTEM AND METHOD FOR PROVIDING A REMOTE KEYBOARD/VIDEO/MOUSE IN A HEADLESS SERVER

FIELD OF THE DISCLOSURE

This disclosure generally relates to information handling systems, and more particularly relates to providing a remote keyboard/video/mouse in a headless server.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a host system, an embedded controller, and a management system. The embedded controller may receive first serial data from the host system, converts the first serial data into first video frame information, and stores the first video frame information to a frame buffer of the embedded controller. The management system may read the first video frame information from the frame buffer.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. The use of the same reference symbols in different drawings indicates similar or identical items. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein, and will focus on specific implementations and embodiments of the teachings. This focus is provided to assist in describing the teachings, and should not be interpreted as limiting the scope or applicability of the teachings. Moreover, other teachings can be used along with the teachings of this disclosure, and the teachings of this disclosure can be used along with other disclosures.

Figure 1:
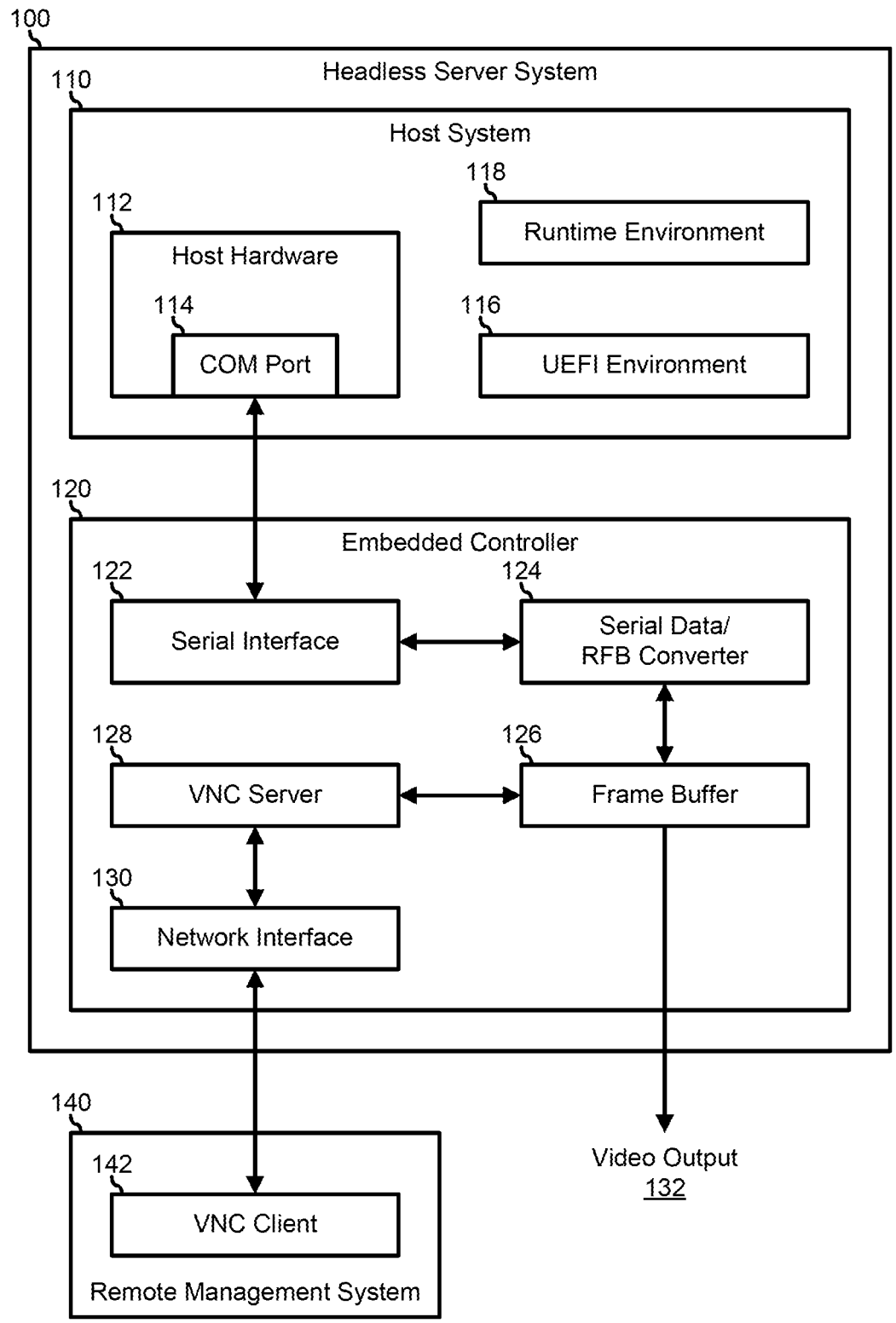
FIG. 1 is a block diagram of a headless server system according to an embodiment of the present disclosure.

FIG. 1 illustrates a headless server system 100 connected via a management network to a remote management system 140. In the illustrated embodiment, headless server system 100 includes a host system 110 and an embedded controller 120. Headless server system 100 represents a reduced functionality information handling system that is intended for use in performing processing tasks that do not need various overhead items for performing those tasks. In a particular embodiment, headless server system 100 is defined in terms of diminished hardware resources of host system 110. For example, host system 110 can be configured without a graphical subsystem, and thus the headless server system can lack the ability to provide video display information. In another example, host system 110 can be configured with minimal human interface input/output (I/O) capabilities, and thus the headless server system can lack the ability to accept keyboard, mouse, or other human interface inputs. In yet another example, host system 110 can be configured without manageability hardware, such as various internal communication interfaces that would otherwise permit the host system to communicate with embedded controller 120, such as an Advanced Microcontroller Bus Architecture (AMBA) High-performance Bus (AHB)-to-Peripheral Component Interconnect (PCI) (AHB-to-PCI) bridge, an internal USB interface, or the like.

In another embodiment, host system 110 is configured as a more fully featured information handling system that includes a graphical subsystem and human interface I/O capabilities. Here, headless server system 100 runs a reduced footprint operating system that reduces or eliminates the software and firmware support for various resources, such as graphical subsystem resources and drivers, human interface I/O resources and drivers, manageability resources and drivers, and the like. An example of a reduced footprint operating system includes a Nano Server option in a Microsoft Windows Server 2016 operating system, various reduced function Linux operating systems, or the like. In another embodiment, headless server system 100 is implemented as a combination of an information handling system with diminished hardware resource that also runs a reduced footprint operating system.

Headless server system 100 can be implemented where the demand for the hardware associated with a more fully featured information handling system and the associated OS overhead is minimal, but where reduced power consumption is desired. For example, where the processing needs of a data center may require little in terms of user display and human interface I/O capability, but where a large quantity of individual processors are still needed to perform the processing task, the overhead from enabling display devices and human interface I/O resources may lead to significant wasted energy and accumulated heat in the data center, or the reduced power consumption might permit additional servers to be brought on line to meet the processing demands of the processing task.

Host system 110 includes host hardware 112, a Universal Extensible Firmware Interface (UEFI) environment 116, and a runtime environment 118. Host hardware 112 includes a serial interface (COM) port 114. Host hardware 112 represents the circuits and devices that make up host system 110. As such, host system 110 can include processors, memory devices, storage devices, I/O interfaces, and the like. UEFI environment 116 represents the operating firmware of host system 110, including UEFI code operable to detect the resources of host system 110, to provide drivers for the resources, to initialize the resources, and to access the resources. UEFI environment 116 permits host system 110 to access remote resources, such as storage devices or arrays, and that operates to boot up the host system. UEFI environment 116 operates to send and receive data and information via COM port 114. It will be understood that the functions and features described herein with respect to UEFI environment 116 may be performed by other elements of host system 110, as needed or desired, and that the firmware environment depicted by UEFI environment 116 may likewise represent another firmware environment, such as a Basic Input/Output System (BIOS), or the like, as needed or desired, and that the teachings of the present disclosure are not limited in their implementation to exclusively run from the UEFI environment. Runtime environment 118 represents the operating environment of host system 110 for performing the processing tasks that the host system is configured to perform. In particular, runtime environment 118 represents the operation and control of host system 110 that is not managed by UEFI environment 116. Runtime environment 118 includes an operating system that launches, operates, maintains, and closes the operating programs and applications that represent the processing tasks of host system 110.

Embedded controller 120 includes a serial interface 122, a serial data converter 124, a frame buffer 126, a Virtual Network Computing (VNC) server 128, and a network interface 130. Embedded controller 120 is connected to host system 110 via a serial communication bus between COM port 114 and serial interface 122. Embedded controller 126 is configured to provide a video output 132 from frame buffer 126. The operation of serial data converter 124, frame buffer 126, VNC server 128, and network interface 130 will be described further, below.

Remote management system 140 is connected to network interface 130 via a management network, and includes a VNC client 142 which operates to communicate video frame information with VNC server. Remote management system 140 represents an information handling system that is connected to embedded controller 120 via network interface 130, to direct embedded controller 120 to manage the functions and features of headless server system 100 and of host system 110. In a particular embodiment, remote management system 140 directs embedded controller 120 to allocate, provision, manage, and deallocate processing tasks to be performed by host system 110. For example, remote management system 140 can instantiate a management suite, such as a Windows Management Instrumentation (WMI) or a PowerShell environment, for allocating, provisioning, managing, and deallocating of the processing tasks. The management suite can also operate to provide remote system monitoring and debug in the event that host system 110 experiences an OS crash or an exception, and to track the status of firmware updates being performed on the host system. In a particular embodiment, the management suite operates based upon the communication of video frame information, that is, by providing directions to embedded controller 120 in the form of graphical content, and receiving status information and the like from the embedded controller in the form of graphical content. In a particular embodiment, the graphical content is provided in accordance with a Remote Frame Buffer (RFB) protocol.

Here, when remote management system 140 needs to communicate with embedded controller 120, the management suite configures video frame information which is communicated to frame buffer 126 via VNC client 142, network interface 130, and VNC server 128. Similarly, when embedded controller 120 seeks to communicate with remote management controller 120, the embedded controller configures video frame information which is stored in frame buffer 126, and remote management system 140 retrieves the video frame information from the frame buffer via VNC server 128, network interface 130, and VNC client 142.

As noted above, headless server system 100 may provide reduced hardware or firmware capabilities which limit the interfaces between host system 110 and embedded controller 120, such as by eliminating an AHB-to-PCI bridge, an internal USB interface, or various manageability resources and drivers. Thus, communications between host system 110 and embedded controller 120 can be limited to data and information communicated over the serial communication bus between COM port 114 and serial interface 122. In particular, where a more fully featured information handling system may be able to communicate video frame information between a host system and an embedded controller of the information handling system, headless server system 100 lacks the ability, on the part of host system 110, to process video frame information. However, as also noted above, remote management system 140 operates to direct the functioning and features of embedded controller 120, and of host system 110, based upon the communication of video frame information between the remote management system and the embedded controller.

Embedded controller 120 operates to bridge the disconnect between the communication of serial data between the embedded controller and host system 110, and the communication of video frame information between the embedded controller and remote management system 140. In particular, remote management controller 140 can utilize a video frame-based management suite to manage, monitor, and control the operation of host system 110, even though the host system has diminished functionality for processing video frame information, and the host system can utilize serial communications to interact with the remote management system without resorting to the communication of serial data over the management network, such as via Serial Over LAN (SOL) communications.

Here, when remote management system 140 needs to communicate with host system 110, the management suite configures video frame information which includes commands, requests, and other information, and communicates the video frame information to frame buffer 126 via VNC client 142, network interface 130, and VNC server 128, as described above. Then serial data converter 124 retrieves the video frame information, extracts the commands, requests, and other information from the video frame information, converts the commands, requests, and other information into serial data for communication to host system 110 via the serial communication bus between COM port 114 and serial interface 122, as described above.

Similarly, when host system 110 seeks to communicate with remote management controller 120, the host system sends serial data, including status information and the like, to embedded controller 120 via the serial communication bus between COM port 114 and serial interface 122. Then serial data converter 124 receives the serial data and formats the status information into video frame information for retrieval by remote management system 140, as described above. In this way, headless server system 100 operates to provide emulated keyboard, video, and mouse functionality to host system 110, notwithstanding the host system's diminished hardware or OS support for such functions. In particular, embedded controller 120 can emulated keyboard and mouse information to host system 110 where the keyboard and mouse information is received from remote management system 140 as graphics-based information. Similarly, embedded controller 120 can receive serial data from host system 110 and can emulate the serial data as video outputs from the host system.

Figure 2:
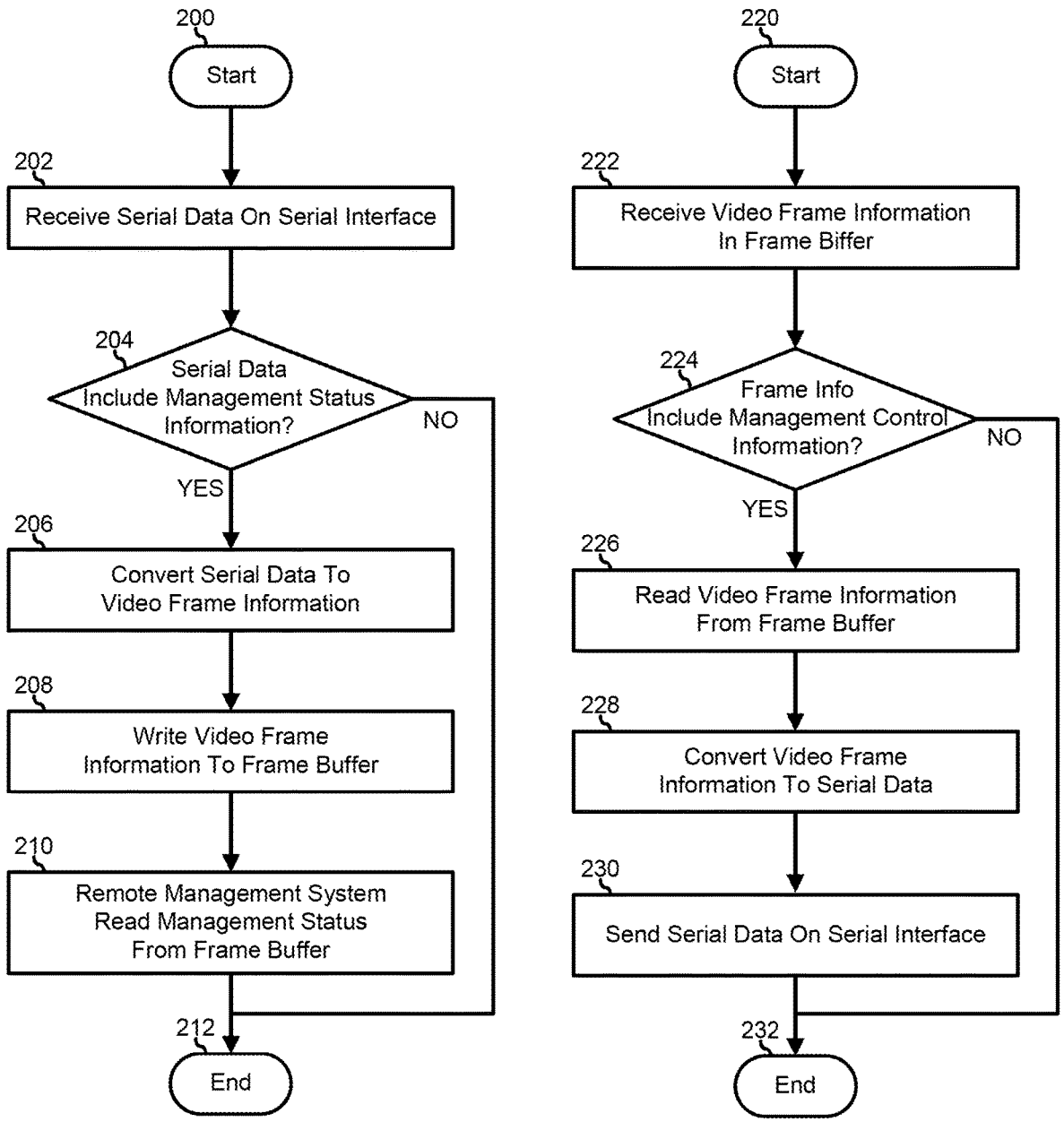
FIG. 2 is a flowchart illustrating a method for providing a remote keyboard/video/mouse in a headless server according to an embodiment of the present disclosure.

FIG. 2 illustrates a method for receiving serial data from host system 110 and providing associated video frame information to remote management system 140, starting at block 200. Serial data from host system 110 is received at serial interface 122 in block 202. A decision is made as to whether or not the serial data represents management status information in decision block 204. If not, the "NO" branch of decision block 204 is taken and the method ends in block 212. If the serial data represents management status information, the "YES" branch of decision block 204 is taken and serial data converter 124 converts the serial data to video frame information in block 206, and writes the video frame information to frame buffer 126. Remote management system 140 reads the management information form frame buffer 126 in block 210, and the method ends in block 212.

FIG. 2 also illustrates a method for receiving video frame information from remote management system 140 and providing associated serial data to host system 110, starting at block 220. Video frame information from remote management system 140 is received at network interface 130 in block 222. A decision is made as to whether or not the video frame information represents management control information in decision block 224. If not, the "NO" branch of decision block 224 is taken and the method ends in block 232. If the video frame information represents management control information for host system 110, the "YES" branch of decision block 224 is taken and serial data converter 124 reads the video frame information from frame buffer 126 in block 226, converts the video frame information to serial data in block 228, sends the serial data to host system 110 in block 230, and the method ends in block 212.

Figure 3:
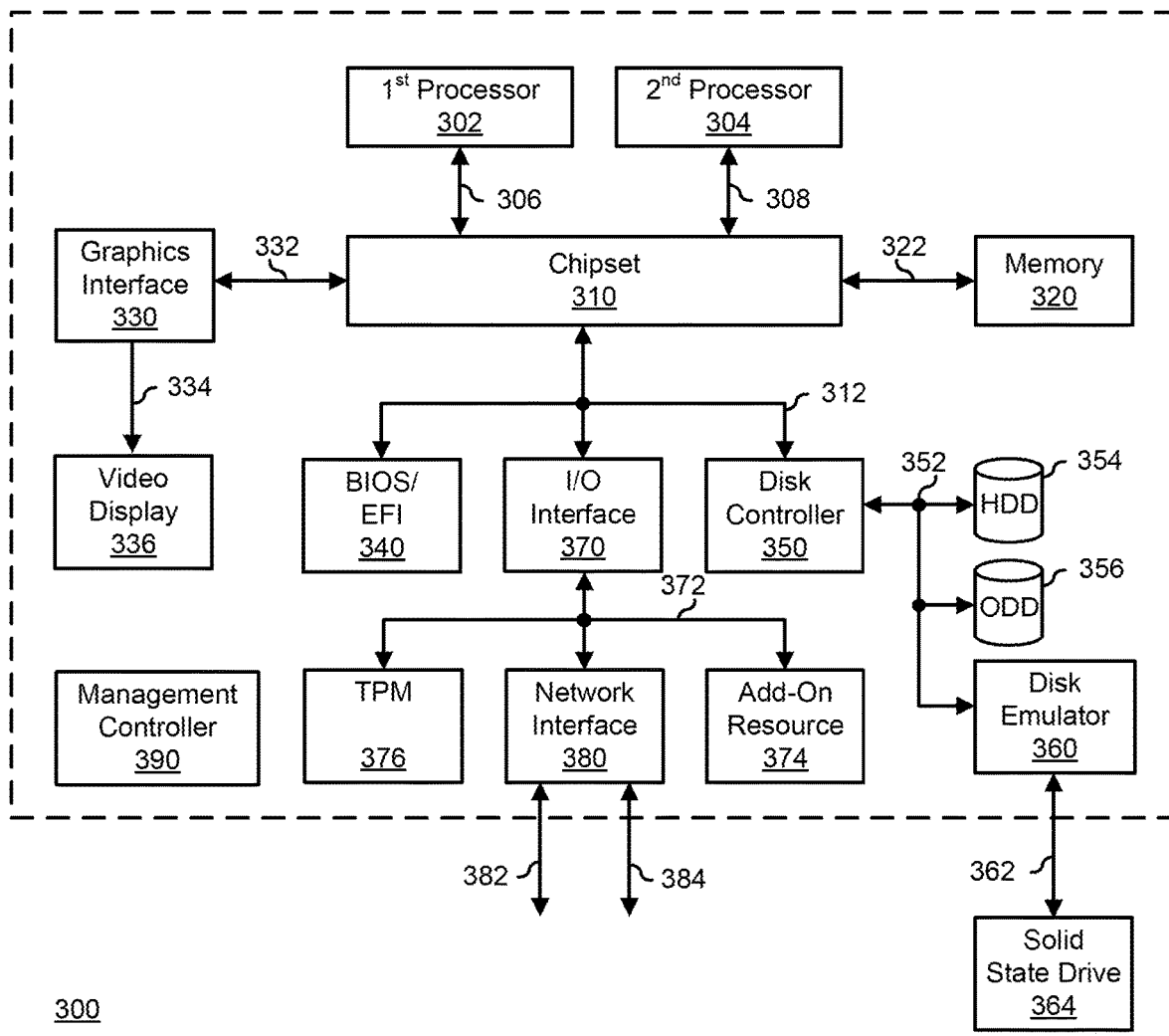
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, a basic input and output system/extensible firmware interface (BIOS/EFI) module 340, a disk controller 350, a disk emulator 360, an input/output (I/O) interface 370, a network interface 380, and an embedded controller 390. Processor 302 is connected to chipset 310 via processor interface 306, and processor 304 is connected to the chipset via processor interface 308. Memory 320 is connected to chipset 310 via a memory bus 322. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof. Graphics interface 330 is connected to chipset 310 via a graphics interface 332, and provides a video display output 334 to a video display 336.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a trusted platform module (TPM) 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof. TPM 376 can include a dedicated crypto-processor and secure storage, to ensure the integrity of information handling system 300 and to detect and prevent tampering with the operating firmware of the information handling system.

Network interface 380 represents a NIC disposed within information handling system 300, on a main circuit board of the information handling system, integrated onto another component such as chipset 310, in another suitable location, or a combination thereof. Network interface 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Embedded controller 390 provides for out-of-band monitoring, management, and control of the respective elements of information handling system 300, such as cooling fan speed control, power supply management, hot-swap and hot-plug management, firmware management and update management for system BIOS or UEFI, Option ROM, device firmware, and the like, or other system management and control functions as needed or desired. As such, embedded controller 390 provides some or all of the functions and features of the embedded controllers described herein.

Figure 4:
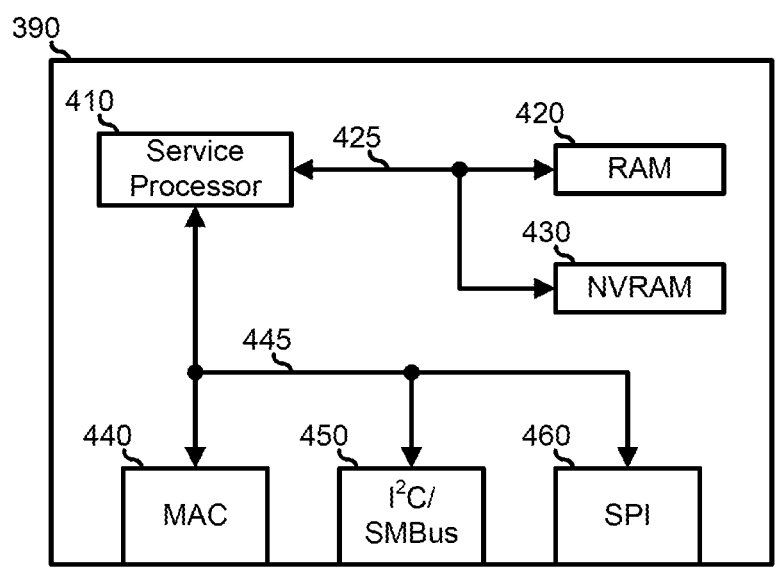
FIG. 4 is a block diagram illustrating an embodiment of a management system of the information handling system of FIG. 3.

FIG. 4 illustrates an embodiment of embedded controller 390, including a service processor 410, a random-access memory (RAM) 420, an NVRAM 430, a media access control interface (MAC) 440, an I²C/SMBus interface 450, and an SPI interface 460. RAM 420 and NVRAM 430 are connected to service processor 410 through a memory bus 425. MAC 440, I²C/SMBus interface 450, and SPI interface 460 are connected to service processor 410 through an I/O bus 445. Embedded controller 390 functions as a separate microcontroller system in information handling system 300, providing a dedicated management channel for maintenance and control of resources in the information handling system. As such, the resources in information handling system 300 are connected to one or more of I²C/SMBus interface 450, and SPI interface 460, permitting embedded controller 390 to receive information from or send information to the resources. A management system can be connected to embedded controller 390 via MAC 440, thereby permitting the embedded controller to receive information from or send information to the management system for out-of-band management of information handling system 300. An example of MAC 440 includes an Ethernet standard interface, such as a reduced media independent interface (RMII), a network communication service interface (NCSI), another network standard interface, or any combination thereof.

In a particular embodiment, embedded controller 390 is included on a main circuit board (such as a baseboard, a motherboard, or any combination thereof) of information handling system 300, integrated onto another element of the information handling system such as chipset 310, or another suitable element, as needed or desired. As such, embedded controller 390 can be part of an integrated circuit or a chip set within information handling system 300. An example of embedded controller 390 includes a baseboard management controller (BMC), an integrated Dell remote access controller (iDRAC), another controller that operates in accordance with an Intelligent Platform Management Interface (IPMI), or any combination thereof. Embedded controller 390 can also operate on a separate power plane from other resources in information handling system 300. Thus embedded controller 390 can communicate with a management system while the resources of information handling system 300 are powered off. Here, information can be sent from the management system to embedded controller 390 and the information is stored in RAM 420 or NVRAM 430. Information stored in RAM 420 may be lost after power-down of the power plane for embedded controller 390, while information stored in NVRAM 430 may be saved through a power-down/power-up cycle of the power plane for the embedded controller.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving, by a baseboard management controller of an information handling system, first serial data from a COM port of a processor of the information handling system, the first serial data including status information from the information handling system;
   converting, by the baseboard management controller, the first serial data into first video frame information based upon a Remote Frame Buffer protocol;
   storing the first video frame information to a frame buffer of the baseboard management controller;
   reading, by a management system external to the information handling system, the first video frame information from the frame buffer;
   storing, by the baseboard management controller, second video frame information from the management system to the frame buffer, the second video frame information including control information for the information handling system;
   reading, by the baseboard management controller, the second video frame information from the frame buffer;
   converting, by the baseboard management controller, the second video frame information to second serial data; and
   sending, by a serial interface of the baseboard management controller, the second serial data to the COM port.

2. The method of claim 1, further comprising:
   determining that the first serial data includes management status information from the processor, wherein converting the first serial data to first video frame information is in response to determining that the first serial data includes management status information.

3. The method of claim 2, wherein the management status information comprises status information for a Nano Server operating system running on the processor.

4. The method of claim 1, further comprising:
   instantiating a Virtual Network Computing (VNC) server on the baseboard management controller.

5. The method of claim 4, wherein, in storing the second video frame information to the frame buffer, the method further comprises:
   writing the second video frame information to the VNC server.

6. The method of claim 1, wherein the processor comprises a headless server system.

7. The method of claim 6, wherein the headless server system lacks at least one of a graphical subsystem, a video display subsystem, and a human interface input/output capability.

8. The method of claim 6, wherein the headless server instantiates a reduced footprint operating system.

9. An information handling system, comprising:
   a processor including a hardware processor and a COM port; and
   a baseboard management controller that:
      receives first serial data from the COM port, the first serial data including status information from the information handling system;
      converts the first serial data into first video frame information based upon a Remote Frame Buffer protocol;
      stores the first video frame information to a frame buffer of the baseboard management controller;
      sends the first video frame information from the frame buffer to a management system external to the information handling system;
      stores second video frame information from the management system to the frame buffer, the second video frame information including control information for the information handling system;
      reads the second video frame information from the frame buffer;
      converts the second video frame information to second serial data; and
      sends the second serial data via a serial interface to the COM port.

10. The information handling system of claim 9, wherein the baseboard management controller further:
    determines that the first serial data includes management status information from the processor, wherein converting the first serial data to first video frame information is in response to determining that the first serial data includes management status information.

11. The information handling system of claim 10, wherein the management status information comprises status information for a Nano Server operating system running on the processor.

12. The information handling system of claim 9, wherein the baseboard management controller further:
    instantiates a Virtual Network Computing (VNC) server on the baseboard management controller.

13. The information handling system of claim 12, wherein, in storing the second video frame information to the frame buffer, the baseboard management controller further:
    writes the second video frame information to the VNC server.

14. The information handling system of claim 9, wherein the processor comprises a headless server system.

15. The information handling system of claim 14, wherein the headless server system lacks at least one of a graphical subsystem, a video display subsystem, and a human interface input/output capability.

16. The information handling system of claim 14, wherein the headless server instantiates a reduced footprint operating system.

17. A non-transitory computer-readable medium including code for performing a method, the method comprising:
- receiving, by a baseboard management controller of an information handling system, first serial data from a COM port of a processor of the information handling system, the first serial data including status information from the information handling system;
- converting the first serial data into first video frame information based upon a Remote Frame Buffer protocol;
- storing the first video frame information to a frame buffer of the baseboard management controller;
- reading, by a management system external to the information handling system, the first video frame information from the frame buffer;
- storing, by the baseboard management controller, second video frame information from the management system to the frame buffer, the second video frame information including control information for the information handling system;
- reading the second video frame information from the frame buffer;
- converting the second video frame information to second serial data; and
- sending the second serial data to the COM port.

18. The computer-readable medium of claim 17, the method further comprising:
- determining that the first serial data includes management status information from the processor, wherein converting the first serial data to first video frame information is in response to determining that the first serial data includes management status information.

19. The computer-readable medium of claim 18, wherein the management status information comprises status information for a Nano Server operating system running on the processor.

20. The computer-readable medium of claim 17, wherein the information handling system comprises a headless server system that lacks at least one of a graphical subsystem, a video display subsystem, and a human interface input/output capability.

\* \* \* \* \*